United States Patent [19]
Tanaka et al.

[11] Patent Number: 5,289,067
[45] Date of Patent: Feb. 22, 1994

[54] BEARING DEVICE

[75] Inventors: Katsuhiko Tanaka, Yamato; Ikunori Sakatani, Fujisawa; Takeyuki Yoshiba, Fujisawa; Shigeru Endo, Fujisawa, all of Japan

[73] Assignee: NSK Ltd., Tokyo, Japan

[21] Appl. No.: 11,980

[22] Filed: Feb. 1, 1993

[30] Foreign Application Priority Data

Jan. 31, 1992 [JP] Japan .................... 4-17002
Oct. 21, 1992 [JP] Japan .................... 4-305849

[51] Int. Cl.$^5$ .................................... H02K 7/09
[52] U.S. Cl. .......................... 310/90.5; 384/107
[58] Field of Search ............ 310/90, 90.5; 384/107, 384/111-115, 120, 123

[56] References Cited

U.S. PATENT DOCUMENTS

| | | | |
|---|---|---|---|
| 4,443,043 | 4/1984 | Yamaguchi | 384/113 |
| 4,512,626 | 8/1985 | Kamiya et al. | 318/558 |
| 4,523,800 | 6/1985 | Yamashita et al. | 310/90 |
| 4,717,223 | 1/1988 | Ishida et al. | 350/6.8 |
| 4,805,972 | 2/1989 | Tanaka et al. | 310/90 |
| 5,046,863 | 9/1991 | Sakatani et al. | 384/115 |
| 5,114,245 | 5/1992 | Tanaka et al. | 384/112 |

FOREIGN PATENT DOCUMENTS

| | | | |
|---|---|---|---|
| 62-131736 | 6/1987 | Japan | 310/90 |
| 62-131737 | 6/1987 | Japan | 310/90 |
| 2-157716 | 6/1990 | Japan | 310/90 |
| 3-67310 | 7/1991 | Japan | 310/90 |
| 3-213715 | 9/1991 | Japan | 310/90 |

*Primary Examiner*—Steven L. Stephan
*Assistant Examiner*—Matthew Nguyen
*Attorney, Agent, or Firm*—Helfgott & Karas

[57] ABSTRACT

A bearing device comprising a fixed shaft having a first radial bearing surface, a sleeve provided in a fitting relationship with the fixed shaft and having a second radial bearing surface opposed to the first radial bearing surface, the second radial bearing surface having herring-bone grooves thereon to form a radial gas bearing to support the sleeve with respect to the fixed shaft, and the fixed shaft having one end portion forming part of a magnetic thrust bearing of aspirating type to support the sleeve with respect to the fixed shaft.

13 Claims, 3 Drawing Sheets

BEARING DEVICE

BACKGROUND OF THE INVENTION

1. Field of the Invention

The present invention relates to a bearing device for an optical deflection scanning device used in an information apparatus, a laser beam printer, and the like, specifically to a dynamic pressure gas bearing device incorporated, for example, in an optical deflection scanning device and used for supporting a polygon mirror which rotates at high speed.

2. Description of the Prior Art

The dynamic pressure gas bearing device maintains a rotating member and a fixed member in a non-contacting state by dynamic pressure produced from dynamic pressure generating grooves formed in one or both mutually opposing surfaces on the two members. Accordingly, there is almost no friction acting between the rotating member and the fixed member. Power used to rotate the rotating member is reduced and heat of friction produced during rotation is prevented.

FIG. 1 shows an example of such a conventional type of dynamic pressure gall bearing device used in an optical deflection scanning device. This conventional example is provided with a cylindrical hole 2 in the center of a housing 1, which is a fixed member. The housing may have a sleeve along the inner peripheral surface of the housing 1. A cylindrical radial bearing surface 3 is provided on the inner peripheral surface of the cylindrical hole 2, and a thrust bearing surface 5 is provided at the center of the bottom surface of the hole 2 with an elevated section 4 of a convex form.

A shaft 6, which is a rotating member, is fitted into the cylindrical hole 2 in the housing 1. A mating radial bearing surface 7 is provided on the outer peripheral surface of the shaft 6, opposing the radial bearing surface 3. Also, a mating thrust bearing surface 9 is provided opposing the thrust bearing surface 5 on one end (lower end in FIG. 1) of the shaft 6. Grooves 8 are provided in the radial bearing surface 7 of the shaft 6 to create dynamic pressure. Specifically, the grooves 8 comprise spiral grooves 8a for the operation of the thrust bearing and herringbone-shaped grooves 8b for the radial bearing, thereby forming a hydrodynamic fluid bearing equipped with dynamic pressure generating grooves. Air is used as the hydrodynamic fluid in this example. Specifically, the shaft 6 rotates at a high speed, so that a dynamic pressure is created between the inner peripheral surface of the housing 1 and the outer peripheral surface of the shaft 6.

When the shaft 6 is stationary, the thrust bearing surface 9 at the lower end of the shaft 6 contacts the elevated section 4 of the thrust bearing surface 5 of the housing 1 and supports an axial load. Then, as the shaft 6 is rotating, dynamic pressure resulting from this rotation is generated at the spiral grooves 8a provided on the radial bearing surface 7 and conducted between the thrust bearing surface 5 and the mating thrust bearing surface 9, so that the axial load is subjected to this pressure for supporting. Accordingly, the shaft 6 rotates without contacting the housing (sleeve) 1 during the rated operation of the bearing device.

A mirror 50 is mounted on the upper section of the shaft 6. The mirror 50 is rotatingly driven together with the shaft 6 by a drive motor 60. The drive motor 60 has a rotor magnet 61 formed from a permanent magnet and mounted on the shaft 6 through a casing 63. A stator coil 64 which opposes the rotor magnet 61 in the radial direction is mounted on the housing 1. In this conventional example, the mirror 50 and the rotor casing 63 are fitted onto the outer peripheral surface of the shaft 6. In addition, the rotor casing 63 is secured to a flange section 6a of the shaft 6 by a screw 65 to secure the mirror 50 between them. The rotor magnet 61 is also secured by an adhesive to the casing 63.

The mirror 50 is made from an aluminium alloy; the casing 63 is made from an iron alloy or steel; and the shaft 6 is made from an aluminium alloy composite containing carbon fiber. The coefficients of linear expansion of these materials are all different.

This type of optical deflection scanning is used in a laser printer or in a digital copier. To reduce the size of the entire machine it is necessary to have a short device in the axial direction. However, with a conventional example, long spiral grooves extending in the axial direction are required to support the axial load on the radial bearing surface, therefore there is the problem that the length of the device in the axial direction cannot be reduced.

In addition, for satisfactory operating characteristics, a short starting period is necessary. This requires a unit which takes a short time to attain a rated rotational speed. Specifically, in a laser printer or in a digital copier, a short time interval is desirable from throwing the switch until the device can be used. Therefore, required is an optical reflection scanning device in which the time interval is as short as possible until reaching the rotational speed at which the device can be used. However, with the conventional example, because in the thrust bearing section, the end surface of the shaft and the bottom surface of the housing (sleeve) are in contact with each other when the rotating member is stationary, the torque from the starting friction is large. In addition, a device must be long in the axial direction enough to ensure an axial load capacity as mentioned above. Accordingly, the inertia of the shaft 6 and a flange section 6a is large, so that it is difficult to reach operating speed within a short time.

In the case of the dynamic pressure gas bearing device, the rotating member and the fixed member are prevented from coming into contact by using the dynamic pressure of the gas (mainly air) as a support force. In the case of a gas, the viscosity, which has a large effect on this support force, is extremely small. Therefore when the speed of rotation of the rotating member is not as high as required, adequate support is not obtained. In other words, while the rate of rotation is low so that the support force is inadequate, the opposing surfaces of the rotating member and the fixed member rub together.

Because there is almost no lubricating capability in the gas which is the dynamic pressure fluid such as air, unless some sort of countermeasures are taken, the rubbing surfaces of the rotating member and the fixed member will quickly wear and the durability of the dynamic pressure gas bearing device is adversely affected.

For this reason, the opposing surfaces of the rotating member and the fixed member are conventionally formed from a ceramic material with superior anti-friction characteristics, or a metal material with lubrication characteristics, such as gold, TiN, or the like is plated onto these surfaces.

However, in the case where the rubbing or sliding surfaces are formed by e.g. a ceramic material, the material and processing costs are high, resulting in high production costs for the dynamic pressure gas bearing device. Also, when the surfaces are plated, not only are the production costs high due to machining steps required before and after plating but sufficient lubrication is not always obtained. When a comparatively large load is added to the plated rotating member, there are cases where adequate durability is not obtained when the rotating member is repeatedly stopped and started.

In addition, higher and higher rates of rotation are demanded as improvements in the recording density and increases in printing speed progress. Also, vibrations produced by the optical deflection scanning device during rotation must be restrained to an extremely low level to provide an improvement in printing quality.

When such a rate of rotation is obtained, it becomes increasingly important to maintain imbalance as less as possible because the centrifugal force resulting from the imbalance in the rotating section increases in proportion to the square of the velocity. However, when the rate of rotation becomes high, a large amount of heat is developped because of windage loss from the mirror 50 and the friction in the bearing section in the example of FIG. 1. Therefore, no matter how precise an imbalance modification (balance correction) is applied at normal temperatures, the difference in the coefficients of linear expansion of the various materials resulting from a temperature increase causes the centers of gravity of the mirror 50 and the rotor magnet 61 to slightly move with respect to the center of rotation of the housing (sleeve) 1 in the example of FIG. 1. There is therefore the problem that the vibration of the device increases with time. In addition, even if balance correction is applied at a higher temperature in advance, the vibration increases when rotation next commences. Or, it is almost impossible to obtain enough reduction of vibration under normal operation because the center of gravity is inclined to change irregularly as temperature increases.

These problems in the conventional example of FIG. 1 are caused by the facts; very small gaps are present in the fitting surfaces between the mirror 50 and the shaft 6 and between the casing 63 of the rotor magnet and the shaft 6, and materials with different coefficients of linear expansion are utilized for the mirror 50, the casing 63 of the rotor magnet, and the flange 6a. In addition, because an adhesive is used for bonding the rotor magnet 61 and the casing 63, the gap between the rotor magnet 61 and the casing 63 is filled with the adhesive, so that, although only a very slight thermal expansion occurs, this causes the phenomenon of irregular movement in the gap and the adhesive layer. It should be noted that the adhesive between the rotor magnet 61 and the casing 63 is subjected to elastic deformation from thermal expansion of the rotor magnet 61 and casing 63.

As a result of recent improvements in printing quality, the development of the low vibration device has become increasingly necessary. The effect of the vibration caused by the imbalance due to the development of heat cannot be ignored in this type of high speed rotation, although conventionally this has not been that much of a problem.

SUMMARY OF THE INVENTION

Accordingly, an object of the present invention is to provide, with due consideration to the drawbacks of such conventional devices, a bearing device which is short in the axial direction so as to reach operating speed in a short time and to exhibit only a small amount of vibration during rotation.

Another object of the present invention is to provide a bearing device with a small torque from the starting or stopping friction by preventing friction between the rotating member and the fixed member, e.g. when the rotating member is started or stopped, thus improving the durability of the members.

Another object of the present invention is to provide a dynamic pressure gas bearing device wherein the fricional force operating between the rotating member and fixed member is further reduced, so that the wear of the members is prevented, and the durability of the dynamic pressure bearing device is greatly improved.

BRIEF DESCRIPTION OF ACCOMPANYING DRAWINGS

DETAILED DESCRIPTION OF THE PREFERRED EMBODIMENTS

In the present invention, a bearing device comprises a sleeve and a fixed shaft in a fitting relationship such that a first radial bearing surface is provided on the fixed shaft; while a second radial bearing surface is provided on the sleeve in opposition to the first radial bearing surface on the fixed shaft; with herringbone-shaped grooves provided on at least one of the first and second radial bearing surfaces; and a magnetic thrust bearing of aspirating type provided on the fixed shaft to support the sleeve, wherein a mirror is secured to a flange provided on the outer peripheral surface of the sleeve.

Because a magnetic bearing of aspirating type is used as the thrust bearing in the present invention, spiral grooves as formed for thrust bearing on the conventional radial bearing surface becomes unnecessary. It is therefore possible to provide a bearing device which is short in the axial direction.

Also, because there is no contact part in the thrust bearing section both when stationary and during rotation, the torque from the starting friction is small.

In addition, because the bearing device can be made short in the axial direction, the inertia is small.

Also, the mirror is secured to a flange provided on the outer peripheral surface of the sleeve, and the sleeve has substantially the same linear coefficient of expansion as the mirror. When heat is generated, there is very little breakdown in the balance caused by movement of the center of gravity of the mirror with respect to the center of rotation of the sleeve resulting from a difference in the coefficients of linear expansion.

An embodiment of the present invention will now be explained with reference to the drawings. A dynamic pressure gas bearing device which, in the same manner as the conventional dynamic pressure gas bearing device, comprises a supporting surface on a fixed or stationary member, a supported surface on a rotating member opposing the supporting surface through a minute gap provided at the rotating surface, and dynamic pressure generating grooves formed in at least one of the supporting surface or the supported surface.

Figure 1:
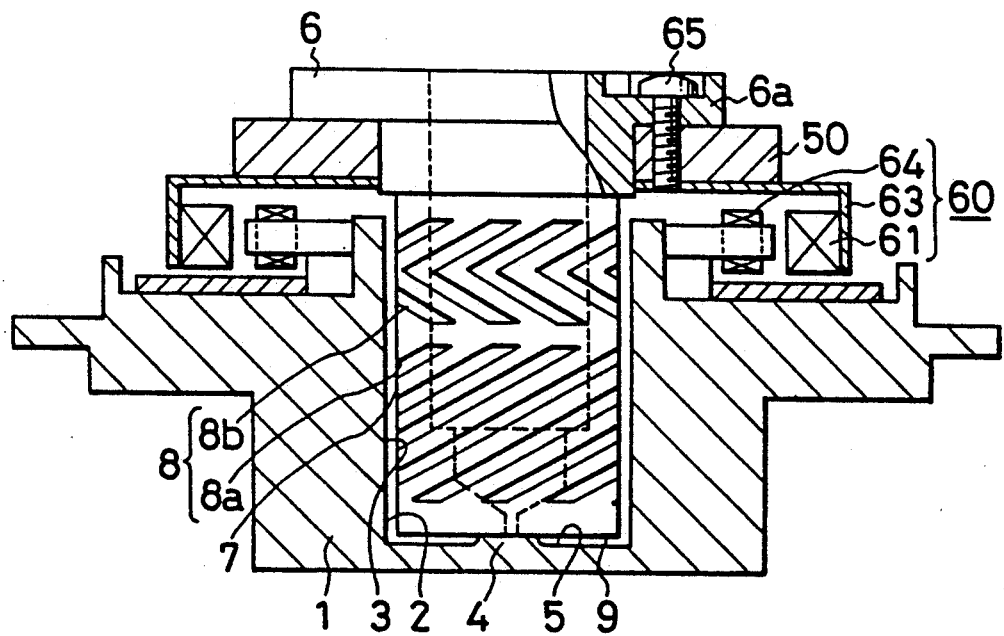
FIG. 1 is a vertical cross sectional view to show an example of a conventional type of bearing device used in an optical deflection scanning device.
Figure 2:
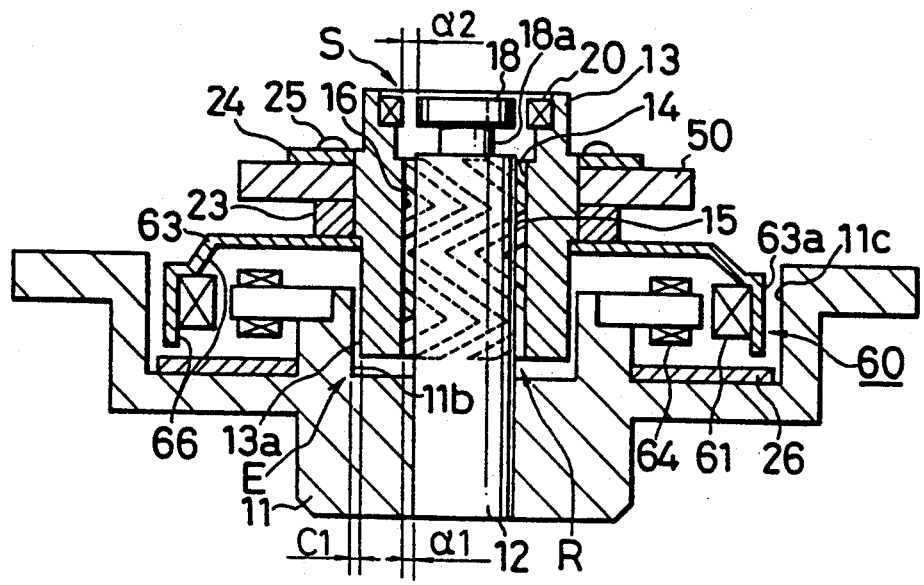
FIG. 2 is a vertical cross sectional view of an embodiment of the present invention.

FIG. 2 is a vertical cross sectional view of an embodiment of the present invention. A housing 11 is constructed so that a gas such as air or the like can be hermetically sealed, as required, by installing a top member (omitted from the drawing) to the housing 11. A fixed shaft 12 is erected in the center section of the housing 11. A sleeve 13 is engaged in a freely rotatable manner with the fixed shaft 12 with a radial bearing gap therebetween.

A first radial bearing surface 15 is provided on the outer peripheral surface of the fixed shaft 12, while a second radial bearing surface 14 is provided on the inner peripheral surface of the sleeve 13. These first and second radial bearing surfaces are in a mating relationship with a radial bearing gap $a\,1$ therebetween. Herringbone-shaped grooves 16 for creating pressure are provided in the radial bearing surface 14 to form a radial hydrodynamic bearing R. It should be noted that the herring bone-shaped grooves be provided in at least one of the radial bearing surface 14 and the mating radial bearing surface 15. The sleeve 13 is supported by an aspirating type magnetic thrust bearing S provided on the free end of the fixed shaft 12.

In this embodiment, the magnetic thrust bearing S has a configuration whereby the sleeve 13 is supported without contacting the fixed shaft 12 by means of the attraction produced by providing the fixed shaft 12 with an end section 18 made from a magnetic material such as stainless steel, for example, SUS440C, SUS420J2 or the like, and the sleeve 13 with a cylindrical permanent magnet 20 secured to the inner surface of the sleeve 13, such that the end section 18 has an outer peripheral surface and the magnet 20 has an inner peripheral surface opposed to the outer peripheral surface of the end section 18 and separated by a thrust bearing gap $a\,2$.

The thrust bearing gap $a\,2$ is larger than the radial bearing gap $a\,1$.

The fixed shaft end section 18 may be formed integrally with or separately from the main body of the fixed shaft 12. Integral formation is desirable because it is easy to ensure the coaxiality of the radial bearing surfaces 14, 15, and difficult to produce an imbalance of magnetic attraction forces. Furthermore, the number of parts is small.

A peripheral groove 18a is provided close to the fixed shaft end section 18 (in the drawing, the end section 18 is separated by the groove 18a from the body of the fixed shaft). As a result, the magnetic flux of the permanent magnet is concentrated at the edge of the peripheral groove 18a in the outer peripheral surface of the fixed shaft 12 to determine the position of the sleeve 13 in the axial direction with respect to the fixed shaft 12. If the peripheral groove 18a is not provided, the attraction would be dispersed in the axial direction, therefore the position of the sleeve 13 in the axial direction would not be set.

Because the tip of the fixed shaft 12 is not made from the permanent magnet which is brittle and easy to break, therefore it is easy to assemble the device by fitting the fixed shaft 12 into the sleeve 13.

In addition, when a nonmagnetic material is used for the fixed shaft 12, the permanent magnet is mounted on the fixed shaft 12 in the converse manner to that outlined above, and a magnetic material is used in the sleeve 13 with a peripheral groove in the sleeve 13.

Further, it is also acceptable to have the sleeve 13 made of a nonmagnetic material and to secure a permanent magnet to the sleeve 13. The sleeve 13 may also be a magnetic material with one part of a magnetic pole provided on each of the upper and lower end surfaces of a permanent magnet secured to the sleeve 13 exposed to the air. In addition, it is also acceptable to make the fixed shaft 12 of a magnetic material with one part of a magnetic pole on each of the upper and lower end surfaces of a permanent magnet secured to the fixed shaft 12 exposed to the air.

When a magnetic bearing is used as the thrust bearing S, the rotating section has a tendency to vibrate vertically due to external vibration because the bearing has low axial rigidity. Accordingly, in this embodiment axial movement is restrained by the provision of a gap $C_1$ of 100 $\mu m$ or less in the radial direction between the lower part of an outer peripheral surface 13a of the sleeve 13 and an inner peripheral surface 11b of the housing 11 mating to the outer peripheral surface 13a, so that an air damper E is provided for resistance against air flowing through the gap $C_1$ in and out of an air gap between the lower surface of the sleeve 13 and the housing 11 whereby axial movement of the rotating section is restrained.

A flange 23 for securing the mirror is secured by a means such as shrink fitting, caulking, or press fitting, or the like to the outer peripheral surface 13a of the sleeve 13. Also, a casing 63 of a drive motor 60 is secured as required by shrink fitting, caulking, or press fitting to the outer peripheral surface of the sleeve 13.

Then, the mirror 50 is fitted onto the outer peripheral surface of the sleeve 13 and loaded onto the flange 23 for securing the mirror 50. The mirror is then secured to the flange 23 and clinched by a screw 25 with a retaining plate 24, made of an aluminium alloy, between the mirror 50 and the head of the screw 25 to prevent deterioration of the precision of the mirror surface.

In this manner, because the flange 23 for securing the mirror is separated from the sleeve 13, it is possible to increase the functionality by fabricating the sleeve 13 and the flange 23 of different materials. Specifically, in this manner, it is possible to make the flange 23 and the retaining plate 24 of an aluminium alloy or the like with almost the same coefficient of linear expansion as the mirror 50. When the temperature increases, the mirror 50 and the flange 23 expand the same amount in the radial direction, so that movement of the center of gravity of the mirror 50 is prevented, so that balance during high speed rotation is therefore improved.

Also, the sleeve 13 is made of a material which slides well on the fixed shaft 12, such as, for example, a structural steel to which a nickel-related plating containing a fluororesin is applied, or an aluminium composite alloy containing a silicon carbide carbon fiber or a ceramic. However, it is possible to make the fixed shaft 12 of a rust-resistant stainless steel, a nitrided stainless steel, a ceramic, or a surface treated structural steel. In this case, the materials are selected so that the coefficient of linear expansion of the sleeve 13 is substantially the same as that of the fixed shaft 12, the change in the gap in the radial direction of the bearing with change in temperature can be minimized.

It is also acceptable to set the space between the rotor magnet 61 of the drive motor 60 and the casing 63 by using an adhesive, but shrink fitting or press fitting is desirably used because any breakdown in the balance during high speed rotation is smaller.

Also, the outer peripheral surface 63a of the casing 63 is positioned so that it opposes the outer section of an inner peripheral surface 11c of the housing 11, whereby safety is considered so that the broken pieces will not fly to the outside from centrifugal force in the unlikely case of breakage of the rotor magnet 61 because of high speed rotation.

Also, a corner section 66 to which an adhesive for balance adjustment is applied is provided on the inner peripheral surface of the casing 63 on both axial sides of the rotor magnet 61 to improve the precision of the balance adjustment during rotation. It should be noted that dispersion of the adhesive from centrifugal force is prevented.

In addition, the permanent magnet 20 may be attached to the inner peripheral surface of the sleeve 13. It is desirable, however, that there be no breakdown of balance during rotation at high speed when affixed by means of shrink fitting or press fitting. Also, centrifugal breakdown of the permanent magnet 20 during high speed rotation is prevented because the outer peripheral surface of the permanent magnet 20 is held in place by the sleeve 13.

A motor base 26 is illustrated in the drawings.

The operation will next be described.

In the above-described bearing device, the sleeve 13 is axially supported with respect to the fixed shaft 12 by means of the aspirating type magnetic thrust bearing S. Therefore, it is unnecessary to provide spiral grooves to carry out the action of a thrust bearing on the radial hydrodynamic bearing R, so that a device is short in the axial direction and can be easily constructed.

Also, because the aspirating type magnetic thrust bearing S is used, the sleeve 13 is normally attracted magnetically, and it is unnecessary to provide a means to prevent displacement during transportation. There are also no restrictions as to the attitude assumed during operation, so it can be freely set vertically, laterally, or at an angle. Further, the starting friction torque is small because the thrust bearing section supporting the weight of the rotating section itself is not contacted while stationary or while rotating. The axial length can be reduced so that inertia is low. As a result, only a short time is required for the device to reach operation speed.

Also, since one side of the magnetic thrust bearing S is a permanent magnet and the outer side is a magnetized member, only one expensive permanent magnet is required. Assembly is therefore simple, the cost of the bearing device is low, and mass production is easy.

In addition, because the flange 23 for securing the mirror is made of a material with almost the same coefficient of linear expansion as the mirror, and secured by shrink-fitting, caulking, or press-fitting onto the outer peripheral surface of the sleeve 13 with no gap between fitting surfaces. Accordingly, when the mirror 50 expands as a result of heat generated from rotation, the flange 23 also expands only the same amount in the radial direction. Accordingly, the position of the center of gravity of the mirror 50 is almost unchanged.

Also, the rotor magnet 61 and the casing 60 can be secured each other without a gap therebetween, by means of such as a shrink fit, caulking, or a press fit or the like, and the movement of the center of gravity caused by an elevation in temperature is prevented in these sections. Accordingly, there is substantially no breakdown in balance caused by movement of the center of gravity, and vibration during rotation is small.

Figure 3:
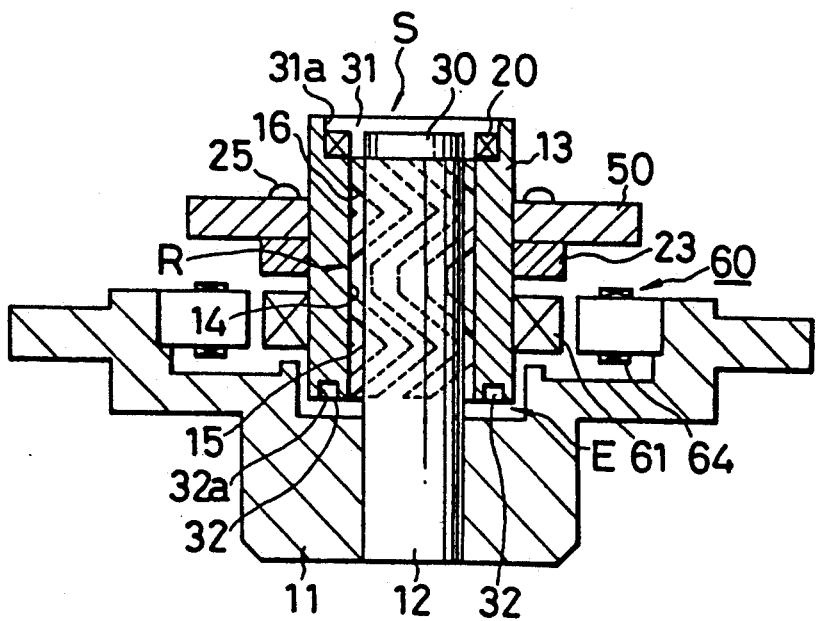
FIG. 3 is a vertical cross sectional view of a second embodiment of the present invention.

FIG. 3 illustrates a second embodiment of the present invention.

In this embodiment the drive motor 60 is not the outer rotor type of the first embodiment. Instead, a so-called inner rotor type of motor is used in which the rotor magnet 61 is directly secured to the outer peripheral surface of the sleeve 13 by press-fitting, shrink-fitting, or the like, and is positioned inside the stator coil 64. The rotor casing is therefore unnecessary and the number of parts is small. However, because there is no reinforcing member on the outer peripheral surface of the rotor magnet 61, it is necessary to make the magnet 61 of a strong magnet to prevent centrifugal breakdown during rotation.

A nonmagnetic member, for example, of nonmagnetic stainless steel or ceramic is used as the fixed shaft 12 of this embodiment. A ring-shaped (or disk-shaped) magnetic member 30 forming the magnetic thrust bearing S is secured to the end of the shaft 12. As a result, the peripheral groove 18a in the tip of the fixed shaft 12 of the first embodiment becomes unnecessary, with the advantage that a low configuration is possible for this part. In addition, the radial bearing can be axially extended by an amount equivalent to the axial length of the peripheral groove 18a.

In order to reduce the number of parts, the retaining plate 24 of the first embodiment is eliminated, and the mirror 50 is mounted directly on the flange 23 using the screw 25.

An adhesive for balance adjustment can be applied to an inner peripheral surface 31 on the upper end of the sleeve 23 and to an inner peripheral surface 32 of a peripheral groove provided in the lower end of the sleeve 23.

The rest of the configuration, the operation, and the effect of this embodiment are almost the same as for the first embodiment.

Incidentally, a permanent magnet secured to the fixed shaft 12 may oppose a permanent magnet secured to the sleeve 13 in the radial direction, to form the aspirating type magnetic thrust bearing.

As explained in the foregoing, in the present embodiments, the coefficient of linear expansion of the flange of the sleeve can be almost the same as that of the mirror. Therefore, even if the mirror can be simply screwed to the sleeve rather than being shrink-fitted, no movement of the center of gravity occurs from expansion of the mirror when subjected to an elevation in temperature, so that vibration during rotation can be kept small. In addition, installation of the mirror is simplified and deterioration of the precision of the mirror surface can be minimized.

In addition, because axial loading is supported by an aspirating magnetic thrust bearing, spiral grooves used with the thrust bearing on the radial bearing surface becomes unnecessary. As a result, it is possible to have a bearing device which is short in the axial direction. Furthermore, because the thrust bearing gap is larger than the radial bearing gap, there is substantially no contact in the thrust bearing surfaces either when stationary or during rotation. Torque from the starting friction is therefore small. Accordingly, it is possible to provide a bearing device in which the time required to reach operational speed is short.

Figure 4:
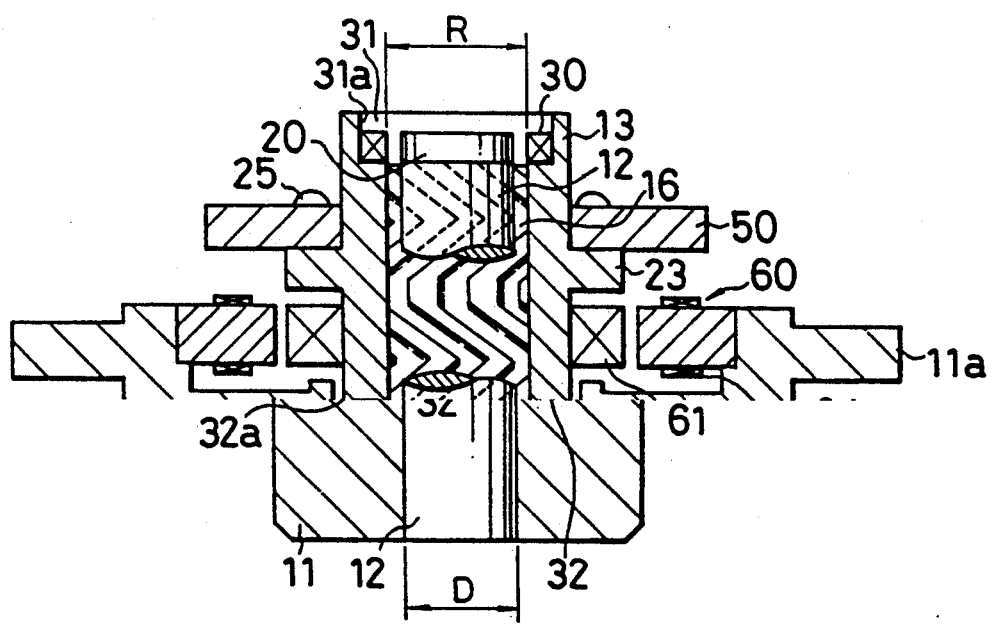
FIG. 4 is a vertical cross sectional view of a third embodiment of the present invention.

FIG. 4 illustrates a third embodiment of the present invention. In particular, in the dynamic pressure gas bearing device of the present embodiment, an oil film is formed on at least one of the supporting surface and the supported surface, that is, the radial bearing surfaces.

A housing 11 is secured to a base or like of the optical deflection scanning device by means of a flange 11a provided on the outer peripheral surface of the housing 11. A fixed shaft 12, which is a non-rotating member, is secured to the center section of the housing 11 and projects from the upper surface of the housing 11. The fixed shaft 12 is fabricated from a nonmagnetic material such as an austenitic stainless steel or the like. A disk-shaped permanent magnet 20 is secured to the upper end surface of the fixed shaft 12. The outer peripheral surface of the fixed shaft 12, which is the supporting or bearing surface, is subjected to a nitriding process.

A cylindrical sleeve 13, which is a rotating member, is provided in a freely rotatable manner on the periphery of the fixed shaft 12. The sleeve 13 is fabricated from a nonmagnetic soft metal such as an abrasion-resistant aluminium alloy, brass or the like. An inner diameter R of the sleeve 13 is slightly (for example, 6 to 20 $\mu$m) larger than the outer diameter D of the fixed shaft 12. Accordingly, a minute radial bearing gap of about 3 to 10 $\mu$m exists over the entire periphery between the outer peripheral surface of the fixed shaft 12 and the inner peripheral surface of the sleeve 13.

A ring-shaped magnetic member 30 is secured to the upper end of the inner peripheral surface of the sleeve 13 at a part opposing the outer peripheral surface of the permanent magnet 20. The sleeve 13 is maintained in an upright, floating state by the attraction between the magnetic member 30 and the permanent magnet 20. Specifically, the magnetic member 30 and the permanent magnet 20 form a thrust bearing. Also, the gap between the permanent magnet 20 and the magnetic member 30 is larger than the radial bearing gap.

It can be expected to form a thrust bearing, such that the ring-shaped permanent magnet is secured to the sleeve 13, and the disk-shaped magnetic member is secured to the fixed shaft 12. But when the ring-shaped permanent magnet 20 is fabricated by powder metallurgy, there is a tendency for the radial wall thickness not to be uniform along the periphery. When the wall thickness is not uniform, weight balance and magnetic balance along the periphery are difficult to obtain. This is undersirable.

Because the disk-shaped permanent magnet 20 is secured to the fixed shaft 12, this type of problem as mentioned above is substantially avoided. Also, the radial wall thickness of the ring-shaped magnetic member 30 can be easily made uniform along the periphery by machining or the like.

On the inner periphery surface of the sleeve 13, which is the supported surface, a pair of dynamic pressure generating grooves 16, comprising herring-bone grooves and straight-line grooves is formed over the entire periphery by e.g. component rolling. Accordingly, when the sleeve 13 rotates at a high speed, a dynamic pressure is created between the inner peripheral surface of the sleeve 13 and the outer peripheral surface of the fixed shaft 12, so that these two surfaces are maintained in a non-contacting state. Specifically, the dynamic pressure generating grooves 16 form part of the radial bearing.

A rotor 61 is provided on the outer peripheral surface of the sleeve 13, and a stator 64 is provided on the upper surface of the housing 11 at a part opposing the rotor 61, forming an electric motor 60 for rotating the sleeve 13 at high speed. A polygon mirror 50 which is fabricated from an aluminium alloy to form an optical deflection scanning device and is secured to a flange 23 provided on the outer peripheral surface of the sleeve 13. Accordingly, when the sleeve 13 is fabricated from an aluminium alloy, the coefficients of liner expansion of the sleeve 13 and the polygon mirror 50 are substantially identical.

The rotary balance of the sleeve 13 is freely adjusted by applying a suitable adhesive to a boundary section 31a between the upper surface of the magnetic member 30 and the inner peripheral surface of the upper end of the sleeve 13 and to a concave groove 32 formed in the lower end surface of the sleeve 13.

Particularly, in the third embodiment, an extremely thin oil film (for example, 0.2 $\mu$m or less) is formed on the outer peripheral surface of the fixed shaft 12 and the inner peripheral surface of the sleeve 13 using an oil with low volatility such as fluorine oil or the like. This extremely thin oil film can be obtained by preparing a dilute solution of the above-mentioned oil using a solvent such as freon 113 or the like, and immersing the fixed shaft 12 and the sleeve 13 in this solution. The oil and the solvent are adhered to the surface of the fixed shaft 12 and the sleeve 13, and the solvent is evaporated off after the fixed shaft 12 and the sleeve 13 have been lifted out of the solution. A minute amount of the oil remains on the surfaces of the fixed shaft 12 and the sleeve 13 after evaporation to form the extremely thin oil film.

In another method of forming the extremely thin oil film, the undiluted oil is coated onto a specified surface on the inner peripheral surface of the sleeve 13 and the outer peripheral surface of the fixed shaft 12, after which the excess oil is wiped off using a cleaning cloth.

The oil film formed by either of these methods is extremely thin, therefore no fouling of the polygon mirror occurs from the oil. In addition, to maintain the oil film over a long period, it is desirable to use an oil with a vapor pressure of $10^{-4}$ Torr or lower at 20° C., evaporation of which is slight.

During use of the dynamic pressure gas bearing device of the present invention with this structure, power is applied to the electric motor 60 comprising the stator 64 and the rotor 61, specifically to the stator 64 to cause the sleeve 13 as well as the polygon mirror secured to the sleeve 13 to rotate.

Dynamic pressure is generated between the inner peripheral surface of the sleeve 13 and the outer peripheral surface of the fixed shaft 12 in accordance with the increase in the speed of rotation of the sleeve 13, so that the two surfaces are not brought into contact. When the sleeve 13 is started or stopped or while the rotational speed of the sleeve 13 is inadequately low, the inner peripheral surface of the sleeve 13 and the outer peripheral surface of the fixed shaft 12 may be slidable each other. However, because the oil film is formed on these two surfaces, the force of friction operating on the two surfaces is insignificant.

Accordingly, even if the case of repeated starts and stops the friction on the two peripheral surfaces can be kept very small. From tests carried out by the inventors of the present invention, it was found that when no oil film was formed over the two peripheral surfaces, the wear on the two peripheral surfaces progressed to the extent that the device was unable to adequately function as a dynamic pressure gas bearing device at the stage where the sleeve 13 had been repeatedly started and stopped 100 times. However, when an oil film was formed over the two peripheral surfaces, even after more than 20,000 starts and stops, it was confirmed that the device was adequately able to function as a dynamic pressure gas bearing device.

It should be noted that the effect of the present invention is obtained if the dynamic pressure groove 16 is formed on at least one of the outer peripheral surface of the fixed shaft 12 and the inner peripheral surface of the sleeve 13, and that the oil film may also be formed only on the inner peripheral surface of the sleeve 13 or only on the outer peripheral surface of the fixed shaft 12.

In the fourth embodiment which is a modification of the third embodiment, the outer peripheral surface of the fixed shaft is provided with a synthetic resin coating of a mixture of polyphenylene sulfide (PPS) resin base with fluorine resin. Specifically, the fixed shaft is provided with a synthetic resin coating having a thickness of some ten microns, and then subjected to the centerless grinding or other finishing machining at the coated surface to securely form the radial bearing surface thereon with a predetermined size.

Incidentally, when both of the fixed shaft and the sleeve are made of an aluminium alloy having substantially the same linear expansion coefficients, substantially no change in the radial bearing gap would occur in spite of the temperature changes during use. While the aluminium alloys are soft, the fixed shaft made of e.g. stainless steel is hard and not subject to scars, flaws etc. upon processing.

Synthetic resin coating and finishing machining after the coating are easier in providing a synthetic resin coating on the fixed shaft to form a radial bearing surface than in providing a synthetic resin coating on the sleeve to form a radial bearing surface.

Incidentally, a synthetic resin coating may be provided on the end face etc. of the fixed shaft to avoid masking steps in providing the synthetic resin coating.

Because the dynamic pressure gas bearing device of the present invention has the structure described in the foregoing, a simple modification of a conventionally used dynamic pressure gas bearing device provides a high degree of durability.

In the case of the dynamic pressure gas bearing device of the present invention with the above-mentioned configuration, when the rate of rotation is low and insufficient dynamic pressure is generated, even if rubbing occurs between the supporting surface and the supported surface, the force of friction between the two surfaces is low and wear on the two surfaces is prevented.

According to the present invention, a compact magnetic thrust bearing of aspirating type is obtained at an inexpensive cost by forming part of the bearing with one end section of the fixed shaft therethrough.

In addition, it is possible to provide a bearing device having good sliding characteristics with small starting torque wherein abrasion is very little upon contact between the fixed shaft and the sleeve when starting and stopping. Specifically, this is achieved by providing a synthetic resin coating on at least one of the fixed shaft and the sleeve, and by forming in the coating of synthetic resin at least one of the radial bearing surface of the fixed shaft and the radial bearing surface of the sleeve.

What is claimed is:

1. A bearing device comprising:
   a fixed shaft having a first radial bearing surface; and
   a rotational sleeve supported about said shaft in a fitting relationship therewith and having a second radial bearing surface opposed to the first radial bearing surface,
   at least one of the first and second radial bearing surfaces having herringbone grooves thereon to form a radial gas bearing to support the sleeve with respect to the fixed shaft,
   the fixed shaft having one end portion forming part of a magnetic thrust bearing of aspirating type to support the sleeve with respect to the fixed shaft,
   the radial gas bearing having a first radial bearing gap while the magnetic thrust bearing having a second radial bearing gap in communication with said first radial bearing gap and such that the second radial bearing gap is larger than the first bearing gap.

2. The bearing device of claim 1, wherein the fixed shaft is made of a non-magnetic material and has an upper end portion to which a first permanent magnet is secured, and the sleeve is made of a non-magnetic material and has a portion, to which a second permanent magnet is secured in a mating relationship with the first permanent magnet.

3. The bearing device of claim 1, wherein the sleeve is made of an aluminum alloy, and the second radial bearing surface of the sleeve is formed with the herringbone grooves.

4. The bearing device of claim 1, wherein at least one of the first and second radial bearing surface has an oil film thereon.

5. The bearing device of claim 1, wherein at least one of the fixed shaft and the sleeve has a coating of synthetic resin thereon, and at least one of the first and second radial bearing surfaces is formed in the coating.

6. The bearing device of claim 1, further having a housing to which the fixed shaft is mounted, wherein the sleeve has an outer peripheral surface while the housing has an inner peripheral surface such that a radial gap up to 100 μm is formed between the outer peripheral surface and the inner peripheral surface.

7. The bearing device of claim 1, wherein the sleeve has an outer peripheral surface on which a flange portion is formed, and a mirror is mounted to the flange portion and has substantially the same coefficient of linear expansion as the sleeve.

8. A bearing device comprising:
   a fixed shaft having a first radial bearing surface; and
   a rotational sleeve supported about said shaft in a fitting relationship therewith and having a second radial bearing surface opposed to the first radial bearing surface,
   at least one of the first and second radial bearing surfaces having herringbone grooves thereon to form a radial gas bearing to support the sleeve with respect to the fixed shaft,
   the fixed shaft having one end portion forming part of a magnetic thrust bearing of aspirating type to support the sleeve with respect to the fixed shaft,
   the radial gas bearing having a first radial bearing gap while the magnetic thrust bearing having a second radial bearing gap in communication with said first radial bearing gap and such that the second radial bearing gap is larger than the first bearing gap,
   said fixed shaft being made of a non-magnetic material and said end portion thereof being an upper end portion to which a permanent magnet is secured, and said sleeve being made of a non-magnetic material and having a portion to which a ring-shaped magnetic member is secured in a mating relationship with the permanent magnet.

9. A bearing device comprising:
a fixed shaft having a first radial bearing surface; and
a rotational sleeve supported about said shaft in a fitting relationship therewith and having a second radial bearing surface opposed to the first radial bearing surface,
at least one of the first and second radial bearing surfaces having herringbone grooves thereon to form a radial gas bearing to support the sleeve with respect to the fixed shaft,
the fixed shaft having one end portion forming part of a magnetic thrust bearing of aspirating type to support the sleeve with respect to the fixed shaft,
the radial gas bearing having a first radial bearing gap while the magnetic thrust bearing having a second radial bearing gap in communication with said first radial bearing gap and such that the second radial bearing gap is larger than the first bearing gap.
said end portion of the fixed shaft being an upper end portion thereof made of a magnetic material and said sleeve carrying on an inner face thereof a permanent magnet, said upper end portion being in a mating relationship with the permanent magnet.

10. The bearing device of claim 9, wherein the sleeve is made of an aluminum alloy, and the second radial bearing surface of the sleeve is formed with the herringbone grooves.

11. The bearing device of claim 9, wherein at least one of the first and second radial bearing surfaces has an oil film thereon.

12. The bearing device of claim 9, further comprising a housing to which the fixed shaft is mounted, wherein the sleeve has an outer peripheral surface while the housing has an inner peripheral surface such that a radial gap up to 100lm is formed between the outer peripheral surface and the inner peripheral surface.

13. The bearing device of claim 9, wherein the sleeve has an outer peripheral surface on which a flange portion is formed, and a mirror is mounted to the flange portion and has substantially the same coefficient of linear expansion as the sleeve.

* * * * *